(No Model.)  2 Sheets—Sheet 1.
T. S. GRISELL.
ROTARY EXHIBITOR.
No. 560,789. Patented May 26, 1896.
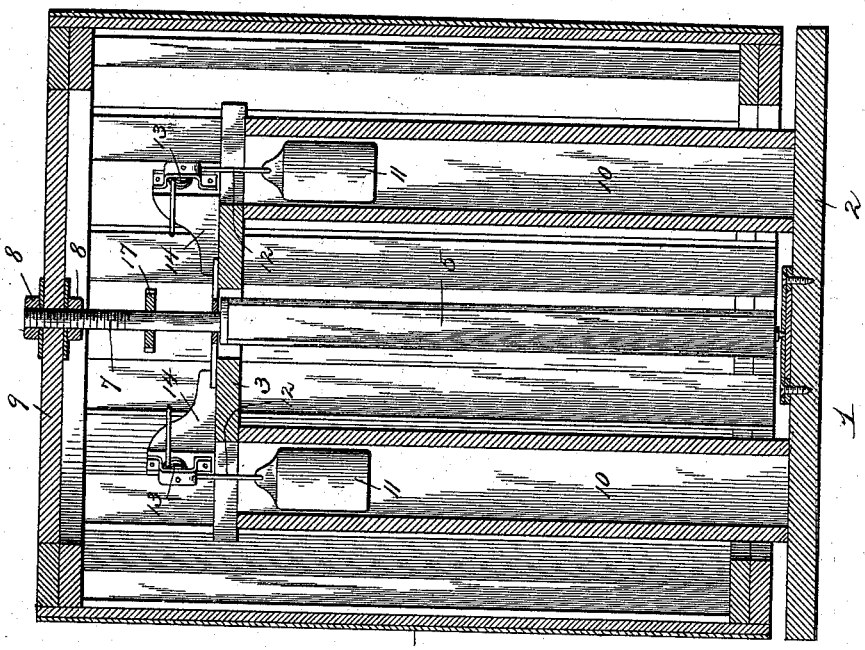
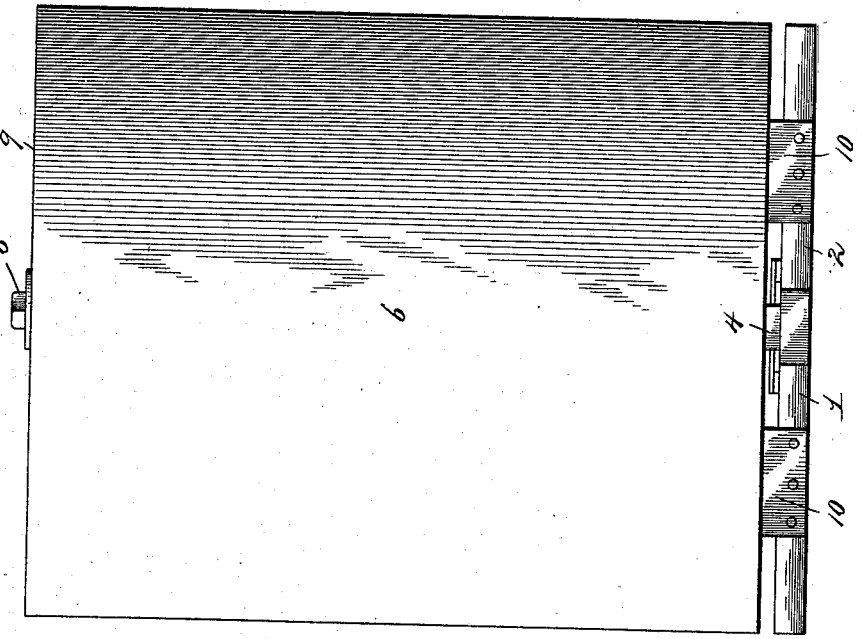
Witnesses
Harry L. Amer.
J. H. Riley
By his Attorneys.
C. A. Snow & Co.
Inventor
Thomas S. Grisell.

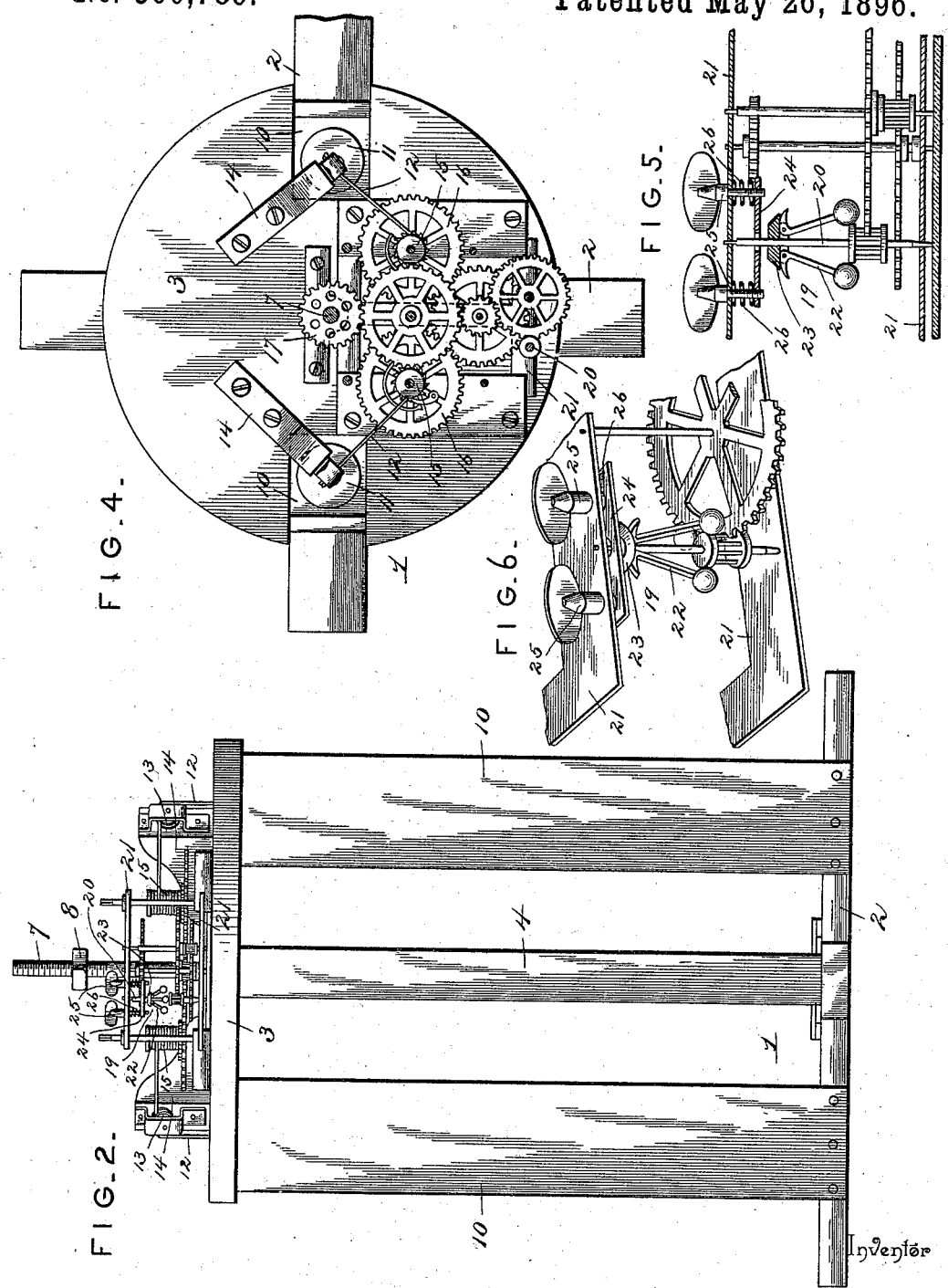

UNITED STATES PATENT OFFICE.

THOMAS S. GRISELL, OF LATHROP, MISSOURI, ASSIGNOR OF ONE-HALF TO MOSES A. GOFF, OF SAME PLACE.

ROTARY EXHIBITOR.

SPECIFICATION forming part of Letters Patent No. 560,789, dated May 26, 1896.

Application filed June 4, 1895. Serial No. 551,630. (No model.)

*To all whom it may concern:*

Be it known that I, THOMAS S. GRISELL, a citizen of the United States, residing at Lathrop, in the county of Clinton and State of Missouri, have invented a new and useful Rotary Exhibitor, of which the following is a specification.

The invention relates to improvements in rotary exhibitors.

The object of the present invention is to improve the construction of rotary exhibitors, and to provide simple and efficient means for causing an exhibitor to rotate at a uniform speed.

The invention consists in the construction and novel combination and arrangement of parts hereinafter fully described, illustrated in the accompanying drawings, and pointed out in the claim hereto appended.

In the drawings, Figure 1 is an elevation of a rotary exhibitor constructed in accordance with this invention. Fig. 2 is an elevation, the rotary carrier being removed. Fig. 3 is a vertical sectional view. Fig. 4 is a horizontal sectional view of the motor-gearing. Fig. 5 is an enlarged sectional view of the governor. Fig. 6 is an enlarged detail perspective view of the governor.

Like numerals of reference designate corresponding parts in all the figures of the drawings.

1 designates a supporting-frame comprising a base 2, a top 3, and vertical posts 4, supporting the top. The base is composed of cross-bars centrally secured together and arranged at right angles to each other; and mounted centrally in the frame is a vertical shaft 5, to which is secured a cylindrical or tubular rotary carrier 6. The shaft has its lower end stepped in a suitable bearing of the base of the frame, and is journaled on the top of the frame, and extends above the same, and is provided with a threaded portion 7, receiving upper and lower nuts 8 for securing the rotary carrier to the shaft.

The rotary carrier, which may be cylindrical or other desired configuration, is designed to carry advertisements or other matter to be exhibited, and it envelops the supporting-frame and conceals the same, and is provided at its top with cross-bars 9, which are connected with the shaft 5.

The supporting-frame is provided at opposite sides with vertical wells or boxes 10, receiving weights 11, which are connected with cords 12, and the latter pass over the pulleys 13 of brackets 14, and are connected to and are adapted to be wound around drums of winding-shafts 15. A pair of winding-shafts is employed, and these shafts are connected by suitable clutches with gear-wheels 16, which are connected by suitable trains of gearing with a gear-wheel 17, carried by the vertical shaft, whereby the latter is rotated by the weights. The descent of the weights is regulated and the rotation of the carrier 6 is rendered uniform by a governor 19, comprising a vertical shaft 20, journaled in the frame 21 of the gearing, and carrying a pinion, which is connected by a train of gears with the gear-wheel 16. On the shaft 20 is mounted a series of independently-pivoted weighted governor-arms 22, having curved upper portions located beneath a loosely-mounted disk 23, located beneath and adapted to engage frictionally an adjustable plate 24, whereby the rotation of the governor-shaft will be retarded, as will be readily understood. The adjustable plate 24 is disposed horizontally and is provided with a central perforation to receive the shaft 20, and has threaded perforations receiving adjusting-screws 25, adapted for raising or lowering the plate 24 to regulate the friction created by the governor. Helical springs 26 are disposed on the adjusting-screws, and are interposed between the upper face of the adjustable plate 24 and the frame, and are adapted to force the plate downward into engagement with the disk. The adjusting-screws enable the descent of the weights to be accurately regulated, and the rotary carrier may be readily caused to rotate at a given uniform speed, even although actuated by weights of different sizes.

It will be seen that simple, inexpensive, and efficient means are provided for regulating the expenditure of power, and that the descent of the weights is controlled and the speed of the rotary carrier is readily governed and maintained uniform.

Changes in the form, proportion, and minor details of construction may be resorted to without departing from the spirit or sacrificing any of the advantages of this invention, such as employing a spring-motor instead of the weights.

What I claim is—

In a rotary exhibitor, the combination of a supporting-frame provided with vertical wells, a vertical shaft journaled in the frame, a tubular rotary carrier mounted on the vertical shaft and concealing the supporting-frame, gearing for actuating the shaft, weights arranged in the vertical wells and connected with the gearing, a governor-shaft connected with said gearing, pivoted governor-arms mounted on the governor-shaft, a disk loosely mounted on the shaft and supported by the governor-arms, a horizontally-disposed plate located above the disk and arranged to be engaged by the same, a pair of vertically-disposed adjusting-screws connected with and adapted to raise and lower the plate and located at the ends thereof, and spiral springs disposed on the screws and engaging the plate and forcing the same downward, substantially as described.

In testimony that I claim the foregoing as my own I have hereto affixed my signature in the presence of two witnesses.

THOMAS S. GRISELL.

Witnesses:
 I. N. B. HICKEL,
 J. H. WAERS.